Aug. 19, 1941.    M. KATCHER    2,252,771
HYDRAULIC STEERING STABILIZER
Filed Nov. 5, 1938    2 Sheets-Sheet 1
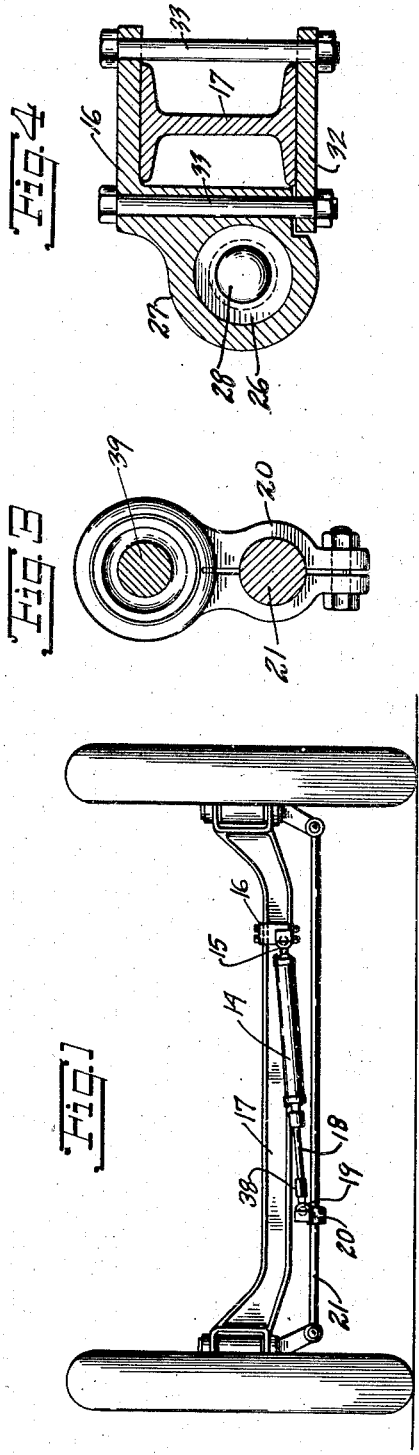
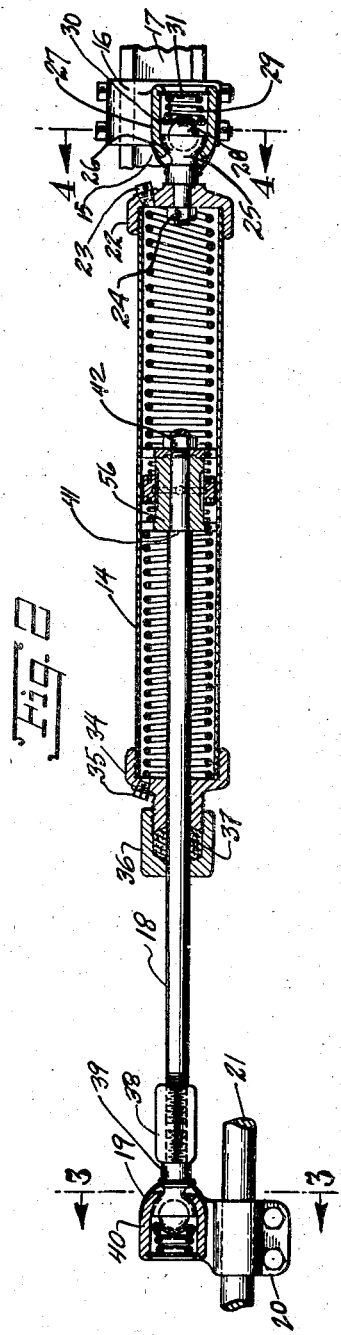
INVENTOR
*Morris Katcher*
BY
*Emanuel Scheyer*
ATTORNEY

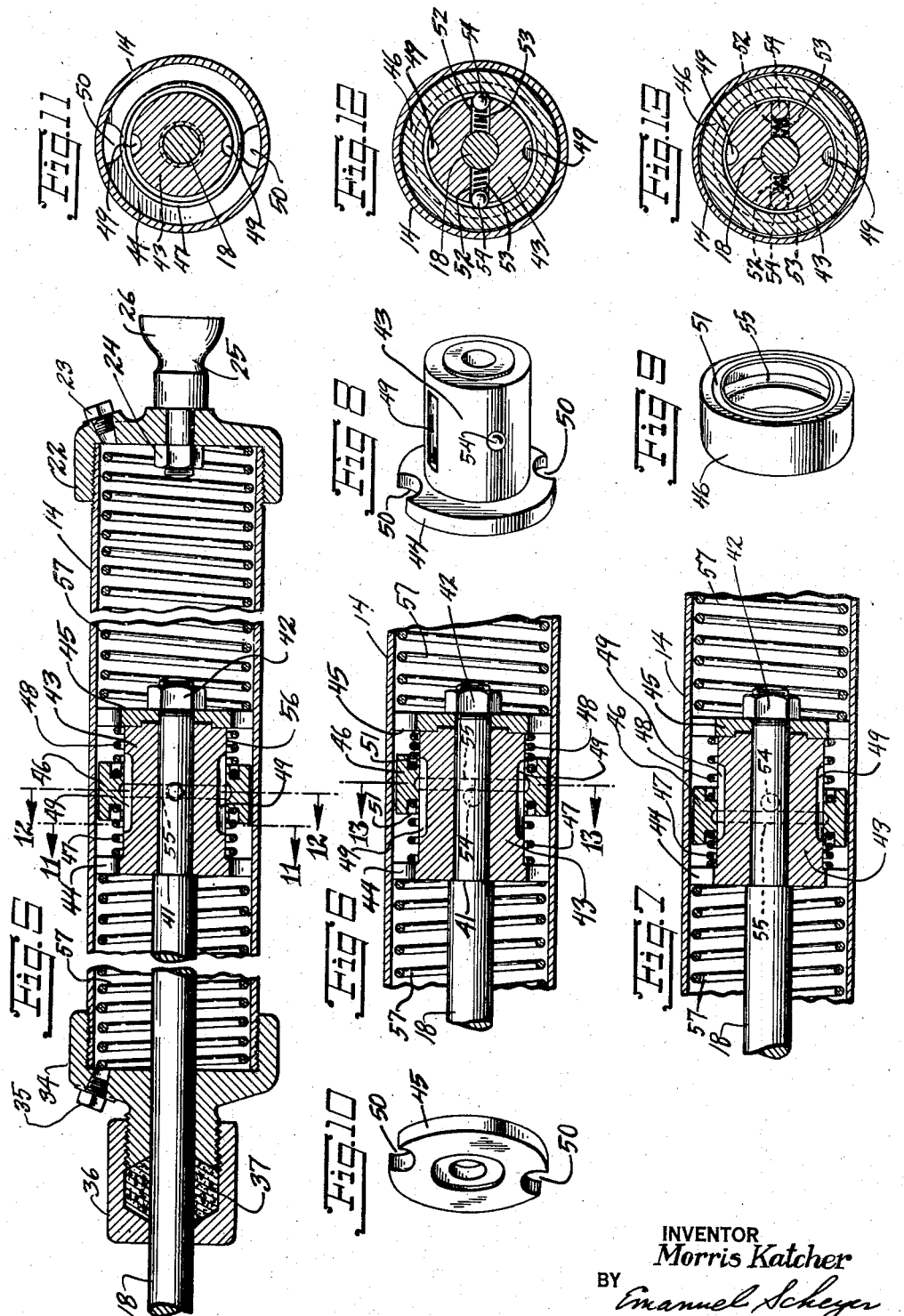

Patented Aug. 19, 1941

2,252,771

UNITED STATES PATENT OFFICE 2,252,771

HYDRAULIC STEERING STABILIZER

Morris Katcher, New York, N. Y.

Application November 5, 1938, Serial No. 238,946

7 Claims. (Cl. 280—90)

This invention relates primarily to a stabilizer for the steering apparatus of motor vehicles, (although it is not limited to such specific use) and it has for its prime object the provision of means for application to the steering apparatus which will act to maintain the front wheels of the vehicle in their proper position to hold the vehicle in a steady course, and prevent so-called "shimmy" or wabble of the front wheels.

A further object is to provide mechanism of the above character which can be easily and quickly applied to existing vehicles without the necessity for any material change or alteration in the vehicles, and which is equally applicable to new vehicles without any material structural alteration therein.

Another object is to provide mechanism of the above character so constructed and arranged that the ordinary operation of the steering apparatus is but little intefered with, but that sudden shocks will be prevented from turning the wheels off their course. Springs are provided to assist in automatically returning the wheels to position for straight forward driving.

A further object is to provide a device of the above character which will be simple and inexpensive in construction and simple and efficient in operation.

Another object is to provide mechanism of the above character which will, in the event of a tire being suddenly deflated such as by a "blow out" or being "thrown" while the vehicle is in motion, act to hold the vehicle to its course, thus greatly reducing, if not entirely eliminating, the possibility of overturning.

Other objects and advantages will become apparent upon further study of the description and drawings, in which:

Fig. 1 is a front view of an automobile front axle, wheels and steering rod with the stabilizer mounted in place, no steering wheel attachment being shown.

Fig. 2 is a longitudinal section of the stabilizer to an enlarged scale, over that of Fig. 1, and shows its attachment to portions of the front axle and steering rod.

Fig. 3 is a cross section taken along the line 3—3 of Fig. 2.

Fig. 4 is a cross section taken along the line 4—4 of Fig. 2.

Fig. 5 is a broken longitudinal section through the stabilizer to a larger scale than that of Fig. 2, the parts of the piston being in normal position to allow steering.

Fig. 6 is a partial longitudinal section of the stabilizer with the piston parts in position to prevent steering motion of the wheels to the left in Fig. 1.

Fig. 7 is a partial longitudinal section of the stabilizer with the piston parts in position to prevent steering motion of the wheels to the right in Fig. 1.

Fig. 8 is a perspective view of the piston by itself without its removable flange.

Fig. 9 is a perspective view of the piston sleeve by itself.

Fig. 10 is a perspective view of the removable flange of the piston by itself.

Fig. 11 is a cross section taken along the line 11—11 of Fig. 5.

Fig. 12 is a cross section taken along the line 12—12 of Fig. 5, and

Fig. 13 is a cross section taken along the line 13—13 of Fig. 6.

The cylinder 14 of the stabilizer is connected through a universal joint 15 to a bracket 16 on the axle 17 of the automobile. Piston rod 18 is connected through a universal joint 19 to a bracket 20 on steering rod 21.

One end of cylinder 14, Fig. 2, is closed by head 22 which is screwed thereon. Filling screw 23 is provided for the introduction of the stabilizer fluid. Rigidly attached to head 22 by means of bolt 24 is stud 25. The other end of stud 25 has a hemispherical head 26 which is slidably mounted on a spherical inside surface of sleeve 27, allowing a limited universal rotation between said head and sleeve, which form parts of the universal joint 15, Fig. 1. The top of head 26 is provided with a hemispherical cup in which ball bearing 28 is mounted. Ball bearing 28 is held pressed against head 26 by means of spring 29, plate 30 and cap 31. The particular type of universal joint shown is discussed in my pending application Serial #188,222, now Patent No. 2,178,206, granted October 31, 1939. I wish it to be understood that other types of universal joint are suitable for use in my construction. Sleeve 27 has bracket 16 formed thereon. Said bracket is fastened to axle 17 by means of bolts 33 and plate 32.

The other end of cylinder 14 has screwed thereon a head 34 provided with a filling screw 35. The outer end of head 34 is threaded to receive a gland 36 provided with packing 37. Piston rod 18 passes through cap 34 and gland 36 with a sliding fit. The outer end of piston rod 18 is threaded to receive screw coupling 38. The other end of the coupling is fastened to stud 39 of the universal joint 19. Sleeve 40 of joint 19 is attached to bracket 20 which is bolted to steering rod 21. Joint 19 is similar to joint 15 described above.

The inner end of piston rod 18, Figs. 2, and 5-13, has the piston 56 held thereon between shoulder 41 and nut 42. The piston 56 comprises a shank portion 43 and flanges 44 and 45 at opposite ends. Flange 44 is preferably formed integral with shank portion 43, while flange 45 is detachable to permit the assembling of valve sleeve 46 and springs 47 and 48 over said shank portion. Sleeve 46 has a sliding fit on shank 43. Diametrically opposite longitudinal grooves 49 are provided for a portion of the length of shank 43, which with the inside surface of valve sleeve 46 act as ports. Flanges 44 and 45 are also grooved giving rise to ports 50. With sleeve 46 in its mid position on shank 43, Fig. 5, the fluid in the left end of cylinder 14 can pass through ports 50 in flange 44, then through grooves 49 past the sides of sleeve 46 and then finally through ports 50 in flange 45. In addition to passing through grooves 49, fluid passes between the outside of sleeve 46 and the inside of cylinder 14, clearance being provided here. Conversely the fluid in the right end of the cylinder can pass through ports 50 in flange 45, through the clearance between sleeve 46 and the inside of cylinder 14, through grooves 49 past the sides of sleeve 46 and then finally through ports 50 in flange 44. With sleeve 46 moved to the right, Fig. 6, the right hand ends of grooves 49 are cut off by sleeve 46 stopping flow of fluid past the sleeve except through the clearance noted above. With sleeve 46 moved to the left, Fig. 7, the left hand ends of grooves 49 are cut off by sleeve 46 stopping flow of fluid past the sleeve except through said clearance. Piston 56 rides inside cylinder 14 on flanges 44 and 45 with sleeve 46 enough clear of the cylinder to allow leakage of fluid by said sleeve. This clearance holds down the friction between sleeve 46 and the cylinder and also permits fluid to leak past said sleeve when the sleeve has been moved to cut off grooves 49. The number of grooves 49 and their location circumferentially with respect to each other may be varied.

Spring 47 is mounted on shank 43 between flange 44 and sleeve 46, while spring 48 is similarly mounted between flange 45 and sleeve 46. The sides of sleeve 46 are grooved as at 51 for a better bearing with the ends of springs 47 and 48 and to give more room for the springs without increasing the length of the piston. Normally springs 47 and 48 hold sleeve 46 midway between flanges 44 and 45. In order further to assist in positioning and maintaining sleeve 46 midway, shank 43 is provided with holes 52, in each of which is situated a spring 53 and a ball bearing 54. Springs 53 press ball bearings 54 outward against the inside face of sleeve 46, and when the internal groove 55 of sleeve 46 comes opposite said balls, they pop part way out of holes 52 into said groove, locking the sleeve in its midway position, as seen in Figs. 5 and 12. Sleeve 46 can now be moved from its midway position only when sufficient force is exerted to overcome the pressure of springs 53. In Figs. 6, 7 and 13 sleeve 46 is shown out of its midway position.

Normally the front wheels of an automobile will assume a position for travel in a straight forward direction. If moved out of this position, owing to their manner of mounting on the axle they will tend to return to this position. With the wheels in this position, piston 56 is preferably in the center of cylinder 14. Springs 57, which are located in cylinder 14 between the ends of piston 56 and the heads 22 and 34 of said cylinder normally hold said piston in the center of the cylinder. This assists the normal tendency, noted above, of the front wheels to remain and return to their position for forward travel.

During the ordinary operation of the steering mechanism by the driver, the movement of piston 56 lengthwise of the cylinder 14 through the stabilizer fluid therein will be sufficiently slow to avoid forcing valve sleeve 46 from its midway position on shank 43, the capacity of grooves 49 and the clearance around sleeve 46 being sufficient to have the fluid pass through without allowing enough difference in pressure to develop on opposite sides of said sleeve to overcome the holding action of springs 47 and 48 and ball bearings 54. The clearance between sleeve 46 and the inside of piston 14 also ensures that no friction will be developed between the two to displace the sleeve from said midway position. It will be remembered that springs 47 and 48 normally hold sleeve 46 in said midway position, said springs being assisted by ball bearings 54, springs 53 and groove 55 in said sleeve.

In the event of any sudden shock being imparted to the steering mechanism or the wheels, such as the wheels striking a depression or an obstruction, or a tire blows out or is thrown off, the piston is caused to move suddenly, so that grooves 49 and the clearance around sleeve 46 have not the capacity to by-pass the liquid from one side of cylinder 14 to the other developing fluid pressure thereby greater on one side of said sleeve than the other. Depending on the direction of the shock, sleeve 46 is moved either into the position shown in Fig. 6 or Fig. 7. In either of these positions the flow of the liquid past sleeve 46 is mostly stopped which results in substantially stopping the motion of the piston and preventing steering turning of the wheels. When the sudden motion of the piston due to shock is over, the clearance around sleeve 46 permits leakage of fluid past said sleeve allowing springs 47 and 48 to return the sleeve to its mid position. In this position grooves 49 are open again allowing normal steering of the wheels.

1. A stabilizer for the steering mechanism of a vehicle comprising a hydraulic cylinder and piston, said stabilizer adapted for connection between a part of the vehicle stationary with respect to the steering mechanism and the steering mechanism, said piston having a portion of substantially less diameter than the inside diameter of the cylinder, a valve sleeve slidably mounted on said portion and extending from the piston to within a short distance from the inside face of the cylinder, providing a clearance thereby between the sleeve and said face, said piston having a least one longitudinally extending groove on said portion, the length of said groove being greater than the length of said sleeve, said groove providing a passage for fluid from one side of said sleeve to the other when said sleeve is in an intermediate position over said groove, and spring means for normally holding said sleeve in said position, a sudden relative motion between the piston and the cylinder causing the fluid to exert force to remove said sleeve from said position, thereby closing off said passage.

2. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston at its intermediate portion being of substantially less diameter than the inside diameter of the cylinder, the end portions of the piston each being provided with a flange having substantially a sliding fit with the inside of the cylinder, each flange having at least one opening therein for the passage of fluid from one side of the flange to the other, a valve sleeve slidably mounted on the intermediate portion of the piston and extending from said portion to within a short distance from the inside face of the cylinder, providing a clearance thereby between the sleeve and said face, the inside surface of the sleeve and a part of the surface of the piston being spaced from each other when the sleeve is over said part to provide at least one port for the passage of fluid from one side of said sleeve to the other, and spring means for normally holding said sleeve in position over said part, a sudden relative motion between the piston and the cylinder causing the fluid to exert force to remove said sleeve from said position thereby closing off said passage.

3. A stabilizer as claimed in claim 2 in which the spring means for normally holding the valve sleeve in position for the passage of fluid from one side of said sleeve to the other, comprises a spring on the piston between each side of said sleeve and a piston flange.

4. A stabilizer for the steering mechanism of a vehicle comprising two parts, one a hydraulic cylinder and the other a piston, one of said parts being connected to the vehicle at a place stationary with respect to the steering mechanism and the other of said parts being connected to the steering mechanism, said piston having a part of its length of substantially less diameter than the inside diameter of the cylinder and a second part of its length slidably engaging the inside face of the cylinder, said second piston part serving as guide means, a valve sleeve slidably mounted on the first piston part and extending substantially to the inside face of the cylinder, the inside surface of the sleeve and a portion of the surface of the piston at said first piston part being spaced from each other when the sleeve is over said portion to provide at least one port for the passage of fluid from one side of said sleeve to the other, and means yieldingly holding said sleeve normally in position over said portion, a sudden relative motion between the piston and the cylinder causing the fluid to exert pressure to remove said sleeve from said position, thereby closing said port and substantially preventing further relative motion of the piston, said means returning said sleeve to said position upon release of said pressure.

5. A stabilizer for the steering mechanism of a vehicle comprising a liquid containing chamber and a plunger movable therein, said stabilizer adapted for connection between a part of the vehicle stationary with respect to the steering mechanism and the steering mechanism, a valve sleeve movable on the plunger, the inside surface of the sleeve and the plunger cooperating when the valve sleeve is in normal position on the plunger to permit a substantial flow of liquid past the plunger, the inside surface of the sleeve and plunger cooperating substantially to cut off said flow when a sudden relative motion of the plunger and the liquid container displaces the sleeve from said normal position, spring means yieldingly holding the sleeve in normal position, and a releasable snap catch extending between the plunger and sleeve for stiffly holding the sleeve in said position, a sudden relative motion between the plunger and the chamber causing the fluid to exert force to remove the sleeve from said position against the holding action of the spring means and catch.

6. A stabilizer for the steering mechanism of a vehicle as claimed in claim 5 in which the snap catch comprises a ball bearing set in a substantially radial hole provided in the piston, and a spring, in said hole between the inner end of the hole and the ball bearing, urging said ball outward of the hole, the valve sleeve being provided with an internal circumferential groove into which the ball is urged when said groove is brought opposite the ball.

7. A stabilizer for the steering mechanism of a vehicle comprising a liquid containing cylinder and a piston movable therein, said stabilizer adapted for connection between the steering mechanism and a part of the vehicle stationary with respect to the steering mechanism, said piston having a part of its length of substantially less diameter than the inside diameter of the cylinder and a second part of its length slidably engaging the inside face of the cylinder, said second piston part serving as guide means, a valve member movable on the former of said parts of the piston, the inside surface of the valve member and the piston cooperating when the valve member is in normal position on the piston to permit a substantial flow of liquid past the piston, and said valve member substantially cutting off said flow when a sudden relative motion of the piston and the cylinder displaces the valve member from said normal position.

MORRIS KATCHER.